(12) United States Patent
Sheridan et al.

(10) Patent No.: US 10,137,754 B2
(45) Date of Patent: Nov. 27, 2018

(54) EXPANDABLE REFRIGERATION SYSTEM FOR VEHICLES

(71) Applicants: James Sheridan, Windermere, FL (US); Jennifer Sheridan, Windemere, FL (US)

(72) Inventors: James Sheridan, Windermere, FL (US); Jennifer Sheridan, Windemere, FL (US)

( * ) Notice: Subject to any disclaimer, the term of this patent is extended or adjusted under 35 U.S.C. 154(b) by 112 days.

(21) Appl. No.: 14/850,182

(22) Filed: Sep. 10, 2015

(65) Prior Publication Data

US 2016/0089953 A1    Mar. 31, 2016

Related U.S. Application Data

(60) Provisional application No. 62/055,792, filed on Sep. 26, 2014.

(51) Int. Cl.
| | |
|---|---|
| *F25D 3/08* | (2006.01) |
| *B65D 5/36* | (2006.01) |
| *B65D 5/28* | (2006.01) |
| *F25B 21/02* | (2006.01) |
| *F25B 21/04* | (2006.01) |
| *B60H 1/00* | (2006.01) |
| *B60N 3/10* | (2006.01) |

(52) U.S. Cl.
CPC ..... *B60H 1/00542* (2013.01); *B60H 1/00478* (2013.01); *B60N 3/104* (2013.01); *B65D 5/36* (2013.01); *F25B 21/02* (2013.01); *F25D 3/08* (2013.01)

(58) Field of Classification Search
CPC .... F25D 3/08; B65D 5/36; B65D 5/38; F25B 21/02; F25B 21/04; B60H 1/00542; B60H 1/00478
See application file for complete search history.

(56) References Cited

U.S. PATENT DOCUMENTS

| | | | | |
|---|---|---|---|---|
| 3,347,060 A | * | 10/1967 | Barkan | F25D 23/06 220/666 |
| 5,501,076 A | | 3/1996 | Sharp, III et al. | |
| 6,935,526 B1 | * | 8/2005 | Laggar | E05G 1/00 220/4.29 |

(Continued)

FOREIGN PATENT DOCUMENTS

| | | | |
|---|---|---|---|
| WO | WO 2007/054142 A1 | * | 5/2007 |
| WO | WO 2007054142 A1 | * | 5/2007 ........... F25D 17/062 |

*Primary Examiner* — Frantz Jules
*Assistant Examiner* — Erik Mendoza-Wilkenfe
(74) *Attorney, Agent, or Firm* — Jason T. Daniel, Esq.; Daniel Law Offices, P.A.

(57) ABSTRACT

An expandable refrigeration system for vehicles includes a generally rigid frame member having a plurality of walls that define a first hollow interior space. An expandable cooler body that includes a plurality of expandable wall sections is connected to the rigid frame member. The expandable body section is positioned within the first hollow interior space when the system is collapsed, and extends outward therefrom when the system is in the expanded configuration. A refrigeration unit is secured to the rigid frame member and controls a temperature of the expandable body section. A transitional wall member selectively operates as a lid for the cooler body and to secure the cooler body within the frame member.

15 Claims, 7 Drawing Sheets

(56) References Cited

U.S. PATENT DOCUMENTS

| | | | | |
|---|---|---|---|---|
| 7,815,069 B1* | 10/2010 | Bellofatto | ......... | B65D 81/3886 |
| | | | | 190/903 |
| 2002/0144997 A1* | 10/2002 | Mendoza | ............. | D06F 95/002 |
| | | | | 220/9.2 |
| 2004/0035143 A1* | 2/2004 | Mogil | ................... | A45C 11/20 |
| | | | | 62/457.2 |
| 2005/0268622 A1* | 12/2005 | Krieger | ................. | F25B 21/04 |
| | | | | 62/3.6 |
| 2007/0256440 A1* | 11/2007 | Trotter | .................. | F25D 11/00 |
| | | | | 62/298 |
| 2008/0128460 A1* | 6/2008 | Adler | .................. | B60N 2/4876 |
| | | | | 224/275 |
| 2009/0188736 A1* | 7/2009 | Niddam | ................. | A45C 5/14 |
| | | | | 180/167 |
| 2009/0260527 A1* | 10/2009 | Qian | ................... | A23C 9/1226 |
| | | | | 99/453 |
| 2009/0261111 A1* | 10/2009 | Hsu | .................. | B65D 11/1826 |
| | | | | 220/592.2 |
| 2011/0163092 A1* | 7/2011 | Hacsi | ................. | B65D 21/086 |
| | | | | 220/4.25 |
| 2014/0117072 A1* | 5/2014 | Cullen | .............. | B65D 11/1853 |
| | | | | 229/117.05 |

* cited by examiner

EXPANDABLE REFRIGERATION SYSTEM FOR VEHICLES

CROSS-REFERENCE TO RELATED APPLICATIONS

This application claims the benefit of U.S. Application Ser. No. 62/055,792, filed on Sep. 26, 2014, the contents of which are incorporated herein by reference.

TECHNICAL FIELD

The present invention relates generally to refrigeration systems, and more particularly to a thermoelectric refrigeration system for vehicles which can transition between a collapsed and an expanded configuration.

BACKGROUND

As any shopper will attest, one of the biggest issues with transporting fresh foods and other such groceries is that such items must be quickly transported from the store to the home, in order to prevent the same from spoiling. As a result, consumers must carefully plan their schedules to ensure that a grocery store is among the last stops of the day, before rushing home to store the goods within a temperature controlled environment.

There are many known devices that are designed to keep food items cool for various periods of time. For example, traditional coolers utilize a combination of ice and water to maintain a cool interior temperature. Likewise, other food containers such as picnic baskets, for example, often include built-in areas into which frozen gel packages may be inserted to maintain a modicum of chilling durations. Although each of these devices function to provide a modicum of temperature control for a short duration of time, neither device is capable of maintaining a constant temperature for a prolonged and/or indefinite period of time. Also, because coolers and other such devices are bulky in nature, they are not ideally suited for use within automobiles and other such vehicles where space is at a premium.

Accordingly, it would be beneficial to provide a vehicular refrigerator system having an expandable and temperature controlled area which can receive and store items for prolonged periods of time without suffering from the drawbacks of the above noted devices.

SUMMARY OF THE INVENTION

The present invention is directed to an expandable refrigeration system for vehicles. One embodiment of the present invention can include a generally rigid frame member having a plurality of walls that define a hollow interior space. A generally malleable cooler body can be secured along the outside edges of the frame member and can provide a storage area for food and other such items when the device is in the expanded configuration.

The system can also include a refrigeration unit that is secured onto the frame member and can function to control a temperature within the frame and cooler body. A transitional wall member can also be provided. The transitional wall member can selectively engage the expandable cooler body to act as a lid, when the system is in the expanded configuration.

When the system is in the collapsed configuration, the expandable cooler body can be stored within the frame member, and the transitional wall member can selectively engage the outer edges of the frame member to secure the cooler body inside.

Another embodiment of the present invention can include a plurality of connectors and complementary connectors that function to hermetically seal the interior of the system when in the expanded configuration.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
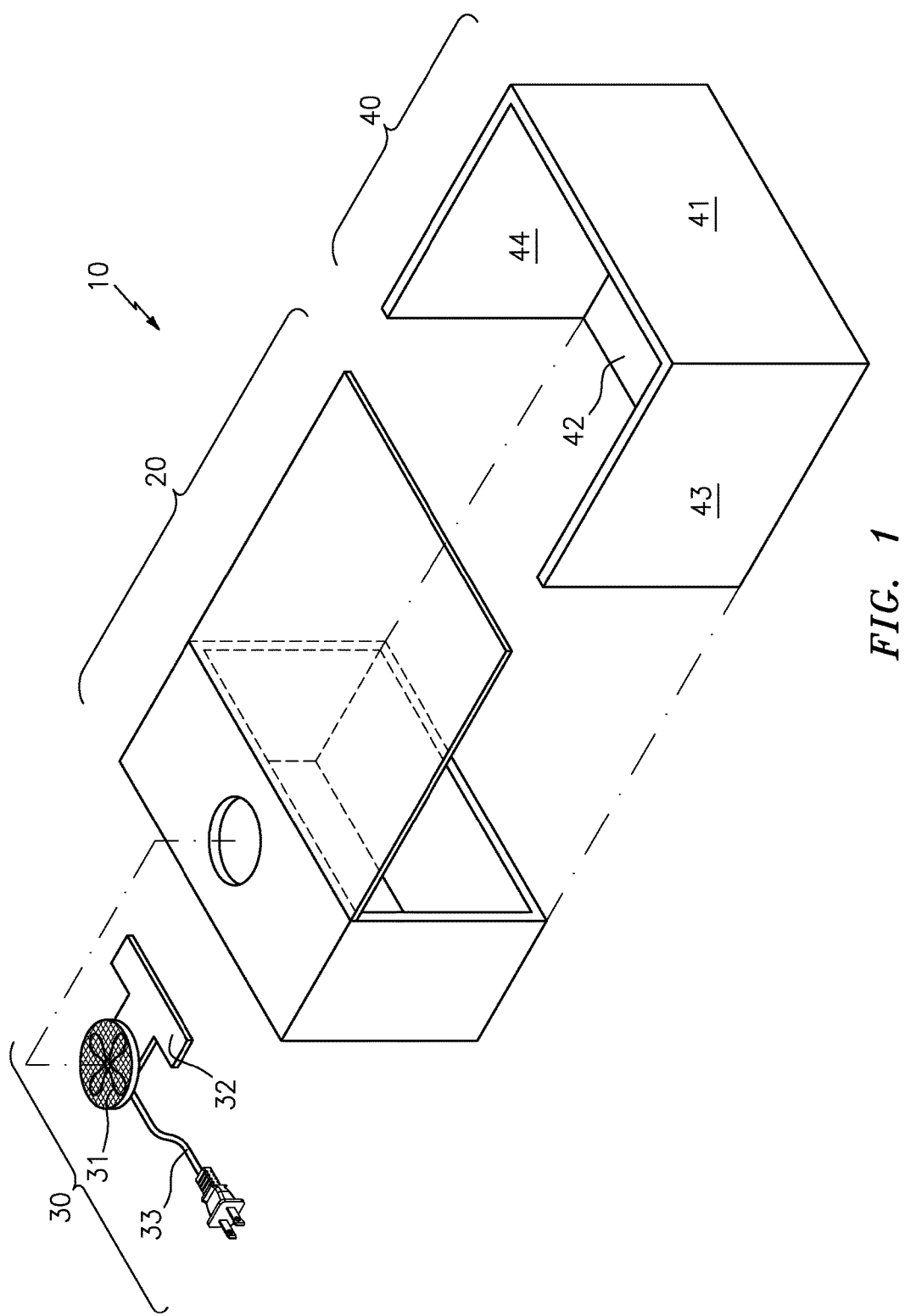
FIG. 1 is an exploded parts view of the expandable refrigeration system for vehicles that is useful for understanding the inventive concepts disclosed herein.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-7 illustrate one embodiment of an expandable refrigerator system for vehicles 10 that is useful for understanding the inventive concepts disclosed herein. As shown, the system can include a frame member 20, a thermoelectric refrigeration unit 30, and an expandable cooler body 40.

Figure 2:
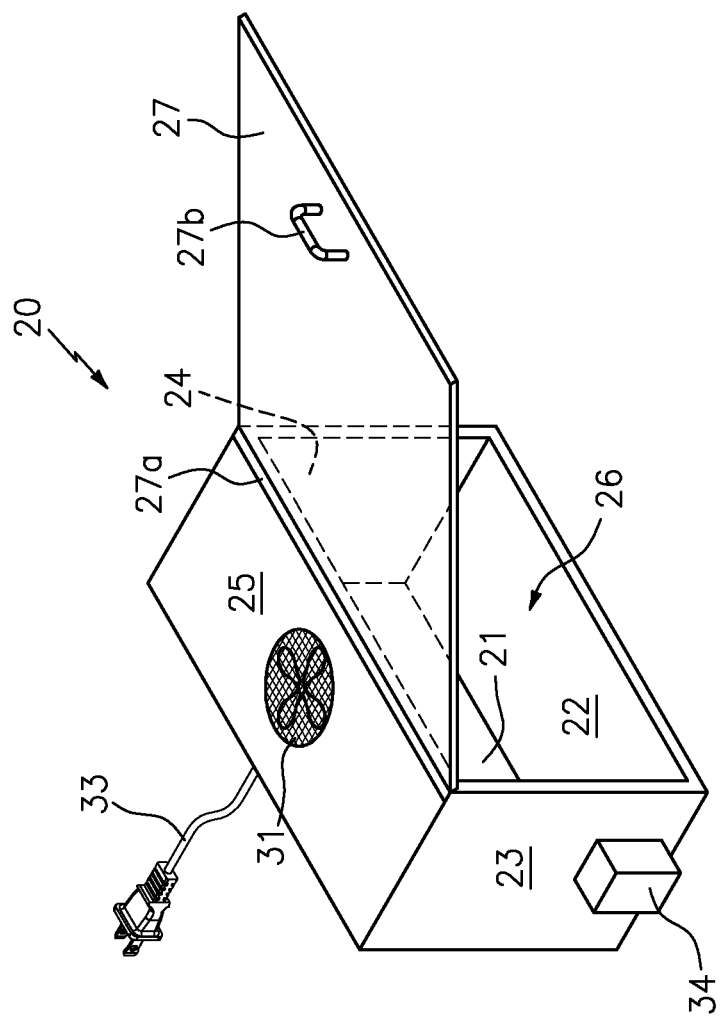
FIG. 2 is a side view of the frame member of the expandable refrigeration system for vehicles, in accordance with one embodiment of the invention.
Figure 3:
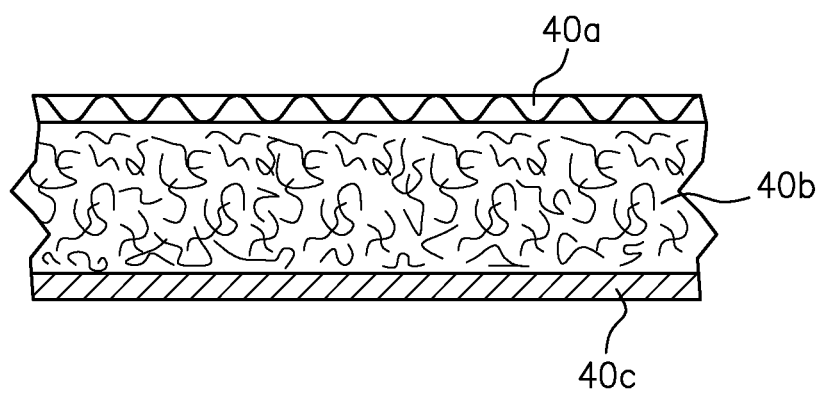
FIG. 3 is a partial fragmentary cross section of the expandable cooler body material of the expandable refrigeration system for vehicles, in accordance with one embodiment of the invention.

As shown best in FIG. 2, one embodiment of the frame member 20 can include a generally rectangular shaped element having a rear wall 21, a bottom wall 22, a first side wall 23, a second side wall 24, and a top wall 25 that are formed together to define a generally hollow interior space 26. A transitional wall member 27 is pivotally secured along the periphery of the top wall 25 via a hinge 27a or other such device. As will be described below, the transitional wall member can engage both the frame and the expanding cooler body, when the device is in the collapsed and expanded configuration, respectively. As such, the transitional wall will preferably include a shape and dimension that is complementary to the area defined by the outside edges of walls 22-24, and can further include an optional handle 27b or other such device.

In either instance, each wall of the frame member can preferably be constructed from a sturdy, lightweight rigid material such as plastic, for example, having excellent thermal isolation qualities. Such a material being suitable for allowing the back wall to be physically mounted within an automobile or other such vehicle. Of course, any number of different construction materials, shapes and sizes, are also contemplated. For example, in another embodiment, the transitional wall member 27 and/or other walls of the frame 20 can be constructed from a substantially identical material as the below described expandable cooler body, in order to provide a soft sided product.

The refrigeration unit 30 can function to generate and/or circulate cool air within the system. In one embodiment, the unit can include a 12 VDC solid-state thermoelectric cooler that is positioned along the top wall 25 of the frame. As shown, the unit can include a heat dispensing member 31 that is located along the outside surface of the frame, and a cooling plate 32 that is positioned along the inside surface of the frame. Each of the heat and cooling plates can be coupled with fans and/or heat sink surfaces to aid in the movement and transfer of hot and cold air. Although shown as including a power cable for receiving external power, other embodiments are contemplated, wherein one or more batteries 34 are provided, in order to operate the device when no external power is available.

The relevant components, construction, and operation of thermoelectric cooling devices are well known in the art and include U.S. Pat. No. 5,501,076, to Sharp, the contents of which are incorporated herein by reference. Of course, any number of other known components capable of providing a climate controlled space are also contemplated. Additionally, it is contemplated that various elements of the refrigeration unit can be positioned along any portion of the frame member 20 and/or the expandable cooler body 40. As such, the refrigeration unit is not limited to placement along the top wall 25.

The expandable cooler body 40 is designed to transition between a collapsed configuration, wherein the cooler body is folded and secured within the interior space 26 of the frame member 20, and an expanded configuration, wherein the cooler body is unfolded and extends outward from the frame body. In this regard, the cooler body 40 can include a front wall 41, a bottom wall 42, a first side wall 43, and a second side wall 44, that are formed together to define a generally hollow interior space 46.

The expandable cooler body is preferably constructed from a generally malleable material. As shown best in FIG. 3, each of the walls 41-44 are preferably formed of different layers of material, such as the illustrated outside layer 40a, middle layer 40b and inside layer 40c, wherein the middle layer is sandwiched between the inside and outside layers. In the preferred embodiment, the outside layer 40a can be formed of a flexible, strong material such as nylon, for example. The middle layer 40b can be formed from any number of known flexible insulating materials such as foam, for example, and the inside layer 40c can be formed of a flexible water resistant material such as PEVA, for example. At least the outside layer 40a and the inside layer 40c are stitched together along the outer edges with the insulating layer 40b retained therebetween, in order to create the illustrated walls 41-44.

Figure 4:
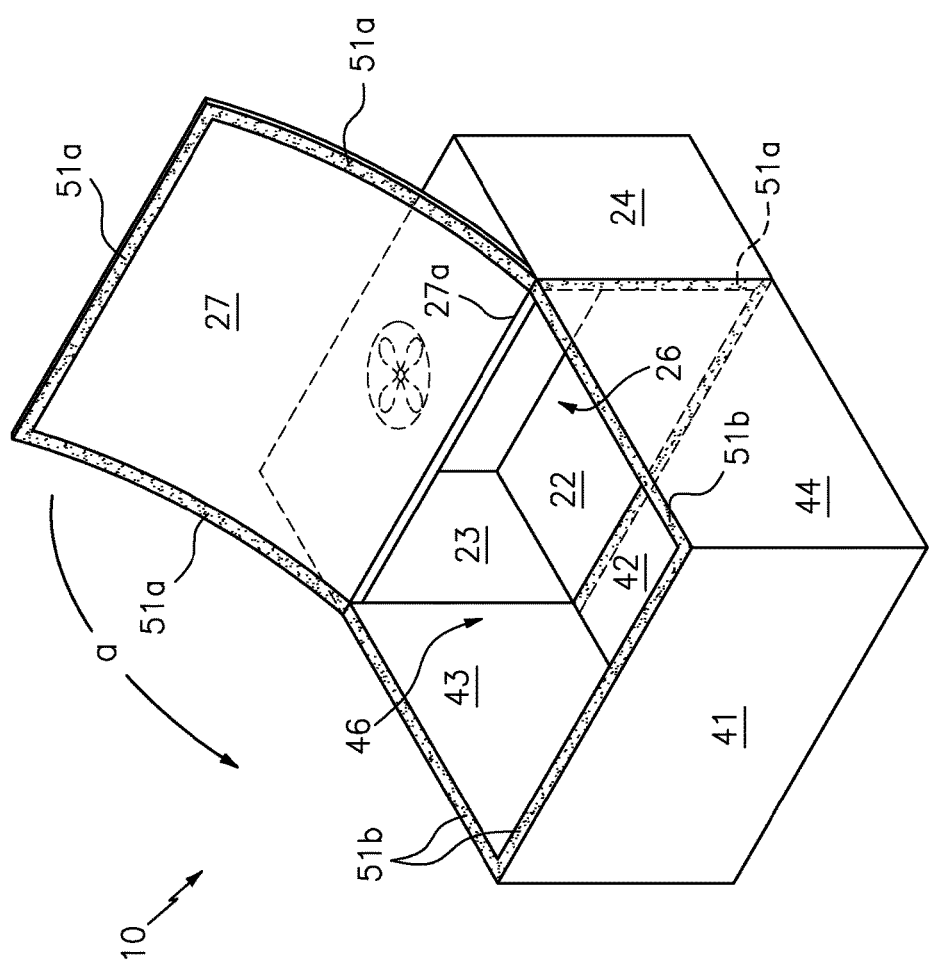
FIG. 4 is a perspective view of the expandable refrigeration system for vehicles in the expanded configuration, in accordance with one embodiment of the invention.
Figure 5:
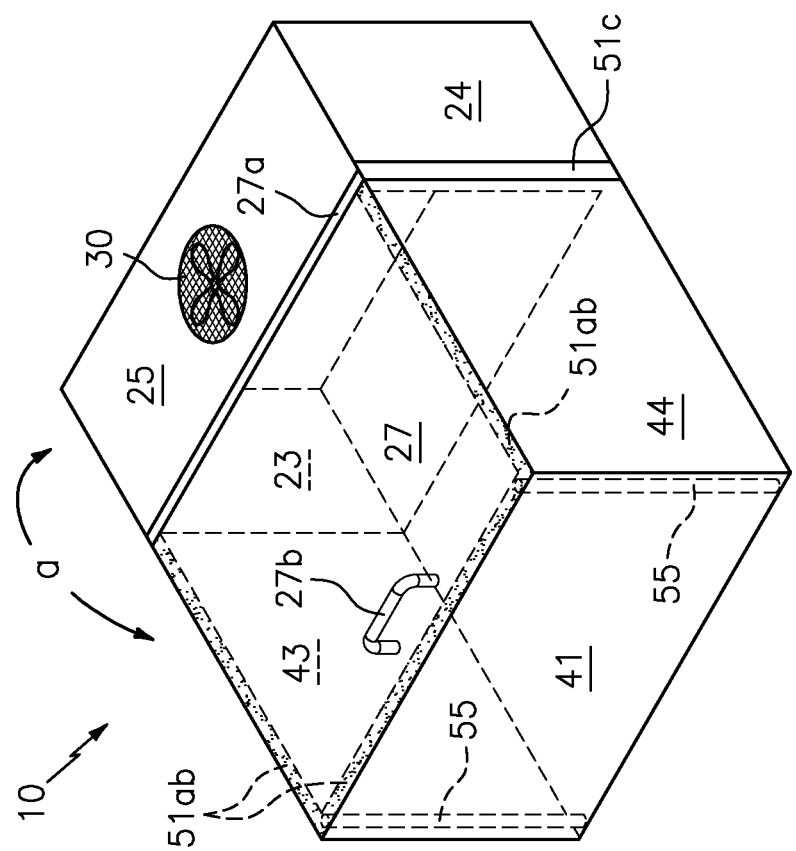
FIG. 5 is another perspective view of the expandable refrigeration system for vehicles in the expanded configuration, in accordance with one embodiment of the invention.

As shown best in FIG. 4, wherein the device is in the expanded configuration, the bottom walls 22 and 42, first side walls 23 and 43, and second side walls 24 and 44 can be joined together along common edges. Each of these walls can be joined utilizing any number of known manufacturing techniques such as heat sealing, bonding and other such methods so as to create an air and watertight connection. Additionally, when the transitional wall 27 is in the open position, any number of items can be deposited within the interior spaces 26 and 46.

In one embodiment, the transitional wall 27 can include connectors 51a along the outside edges thereof. Likewise, complementary connectors 51b can be positioned along the upper edges of each of the front and side walls 41, 43 and 44 of the expandable cooler body. As shown by arrow a, and FIG. 5, when the transitional wall 27 is closed, the connectors 51a and 51b can be aligned and engaged, so as to hermetically seal 51ab the interior spaces 26 and 46, thereby creating a cold storage compartment into which food and other such items can be stored.

As described herein, the terms "connector," and "complementary connectors" can include any number of different elements capable of repeatedly securing two items together in a nonpermanent manner. Several nonlimiting examples include opposing strips of hook and loop material (i.e. Velcro®), magnetic elements embedded within the body materials, and/or various forms of slide fasteners, for example. Each illustrated connector can be permanently secured to the illustrated portion of the device via a permanent sealer such as glue, adhesive tape, or stitching, for example.

In one embodiment, a pair of support rods 55 which can be secured to, or embedded within the outside edges of the front wall 41. The support rods can preferably be constructed from a resilient material such as fiberglass tent poles, fibrapoles and other such members which can function to maintain the outer walls of the expandable cooler body in an upright orientation when deployed, but that can also be bent for easy storage within the frame member 20 when the device is in the collapsed configuration. Although not illustrated, additional support rods can be placed at other locations, such as the sides and/or bottom of the expandable cooler body.

Figure 6:
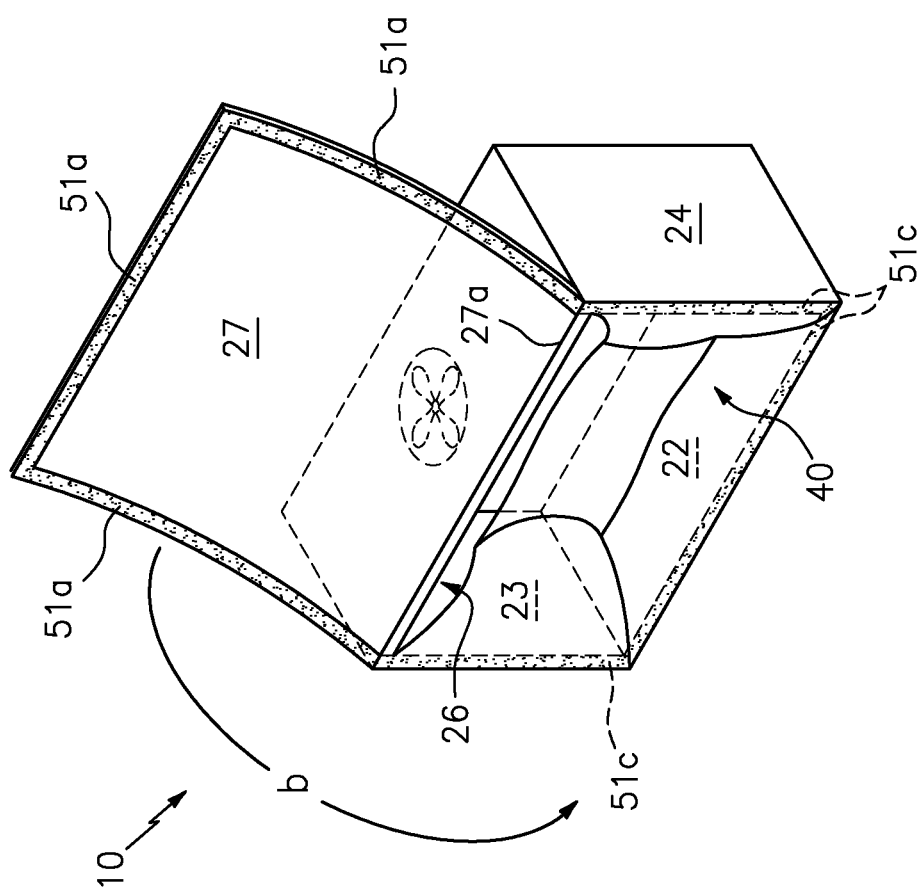
FIG. 6 is a perspective view of the expandable refrigeration system for vehicles in the collapsed configuration, in accordance with one embodiment of the invention.
Figure 7:
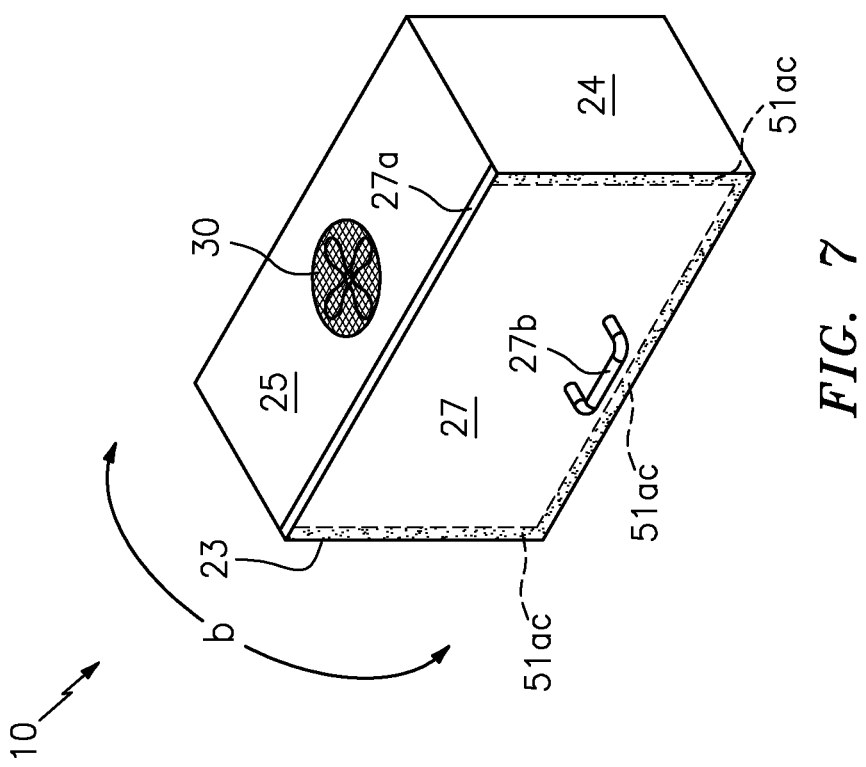
FIG. 7 is another perspective view of the expandable refrigeration system for vehicles in the collapsed configuration, in accordance with one embodiment of the invention.

As shown in FIGS. 6 and 7, additional complementary connectors 51c can also be positioned along the outside edges of the bottom and side walls 22, 23 and 24. As such, the device can transition into the collapsed configuration by folding and/or stuffing the expandable body 40 within the interior space 26 of the frame, and then folding (see arrow b) the transitional wall down until the connectors 51a and 51c engage. At this time, the transitional wall 27 will secure the device in the collapsed configuration, wherein the expandable cooler body 40 is securely positioned within the frame member 20.

Accordingly, the above described vehicular refrigerator system 10 functions to provide an expandable refrigerated compartment for receiving and storing items within the confined space of a vehicle, that can be quickly and easily collapsed when not in use. As such, various embodiments of the system can be designed as OEM components for use in new vehicles such as an automobile, boat, aircraft or train, for example, or can be designed to be incorporated into the same as aftermarket components via a mounting bracket (not illustrated) which can secure the rear wall of the frame onto the vehicle body. In these embodiments, the vehicle power system can provide the necessary power to the refrigerator system, and one or more batteries can also be provided to maintain power to the system when the vehicle is not in use.

As described herein, one or more elements of the expandable refrigerator system for vehicles 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An expandable refrigeration system for vehicles, said system comprising:
    a generally rigid frame member having a plurality of walls that define a first hollow interior space;
    an expandable cooler body having a plurality of expandable wall sections which are parallel to each other, wherein each of the plurality of expandable wall sections which are parallel to each other are joined with each of the plurality of walls of the generally rigid frame member, wherein the expandable cooler body is configured to move from a first position to a second position and back to the first position, wherein the expandable cooler body is positioned entirely within the first hollow interior space when in the first position, wherein the expandable cooler body is positioned at least partially outside the first hollow interior space to form a second hollow interior space when in the second position;
    a transitional wall that is pivotally secured to the generally rigid frame member, wherein the transitional wall is removably coupled with three of the plurality of walls of the generally rigid frame member to completely enclose the expandable cooler body within the first hollow interior space when the expandable cooler body is in the first position;
    wherein the transitional wall is removably coupled with three of the plurality of expandable wall sections which are parallel to each other when the expandable cooler body is in the second position; and
    a refrigeration unit that is secured to the generally rigid frame member, said refrigeration unit fluidly communicating with the first and second hollow interior spaces, and functioning to control a temperature within the first and second hollow interior spaces in the second position.

2. The system of claim 1, wherein each of the plurality of expandable wall sections are joined with one of the plurality of walls of the generally rigid frame member to form a permanent and an airtight connection.

3. The system of claim 1, wherein the expandable cooler body is constructed from a generally malleable material.

4. The system of claim 1, wherein the expandable cooler body includes a bottom wall, a front wall and a pair of opposing side walls that form a generally rectangular shape when in the second position.

5. The system of claim 4, wherein the transitional wall member is in communication with each of the front wall and the pair of opposing side walls when the system is in the second position.

6. The system of claim 5, further comprising: a plurality of connectors that are disposed along a bottom surface of the transitional wall; and a plurality of complementary connectors that are disposed along an upper edge of each of the front wall and the pair of opposing side walls of the expandable cooler body, said connectors and complementary connectors functioning to create a hermetic seal between the transitional wall and the expandable cooler body.

7. The system of claim 1, wherein the rigid frame member includes a back wall, a bottom wall and a pair of opposing side walls that form a generally rectangular shape.

8. The system of claim 7, wherein the transitional wall member is in communication with each of the bottom wall and the pair of opposing side walls when the system is in the first position.

9. The system of claim 8, further comprising:
    a plurality of connectors that are disposed along a bottom surface of the transitional wall; and
    a plurality of complementary connectors that are disposed along an outer edge of each of the bottom wall and the pair of opposing side walls of the rigid frame member, said plurality of connectors and said plurality of complementary connectors functioning to securely engage the transitional wall and the rigid frame member in the first position.

10. The system of claim 1, wherein the refrigeration unit includes a solid state thermoelectric cooler having a heat dispensing member that is disposed along an outside portion of the rigid frame member, and a cooling plate that is positioned along an inside surface of the rigid frame member.

11. The system of claim 10, further comprising a pair of circulation fans that are in communication with each of the heat dispensing member and the cooling plate.

12. The system of claim 1, further comprising a pair of support rods that are in communication with two of the expandable wall sections.

13. The system of claim 1, wherein the expandable cooler body includes a water resistant interior layer.

14. The system of claim 1, wherein the transitional wall member is constructed from a generally rigid material, and functions to create a rigid top surface when the system is in the second position.

15. The system of claim 1, wherein the transitional wall member is constructed from a generally malleable material, and functions to create a soft top surface when the system is in the second position.

* * * * *